United States Patent
Van Order et al.

(10) Patent No.: US 6,227,505 B1
(45) Date of Patent: May 8, 2001

(54) ADJUSTABLE ACCESSORY MOUNT

(75) Inventors: Kim L. Van Order, Hamilton; Sheldon J. Watjer, Holland, both of MI (US)

(73) Assignee: Prince Corporation, Holland, MI (US)

( * ) Notice: Subject to any disclaimer, the term of this patent is extended or adjusted under 35 U.S.C. 154(b) by 0 days.

(21) Appl. No.: 09/058,646

(22) Filed: Apr. 10, 1998

(51) Int. Cl.$^7$ ............................. A47B 96/00; H04M 1/00
(52) U.S. Cl. ........................... 248/222.13; 248/311.2; 224/549; 224/553; 379/454
(58) Field of Search ................ 248/222.13, 221.11, 248/222.11, 223.41, 224.51, 224.61, 224.8, 225.11, 298.1, 27.1, 311.2, 309.1; 224/549; 379/454, 426

(56) References Cited

U.S. PATENT DOCUMENTS

| | | | |
|---|---|---|---|
| 2,068,517 | 1/1937 | Sibbert | 379/454 |
| 2,688,504 | 9/1954 | Parker | 410/105 |
| 2,859,710 | 11/1958 | Elsner | 248/502 |
| 3,946,977 | 3/1976 | Kuhfus | 379/435 |
| 4,113,108 | 9/1978 | Anderson | 211/143 |
| 4,797,916 | * 1/1989 | Kojima | 379/454 |
| 5,040,712 | 8/1991 | Pesonen et al. | 224/547 |
| 5,121,863 | * 6/1992 | Kotitalo et al. | 224/570 |
| 5,392,350 | * 2/1995 | Swanson | 379/446 |
| 5,395,084 | 3/1995 | Ikuma | 248/311.2 |
| 5,396,556 | 3/1995 | Chen | 379/446 |
| 5,524,050 | * 6/1996 | Boerema et al. | 379/441 |
| 5,535,274 | 7/1996 | Braitberg et al. | 379/446 |
| 5,556,017 | * 9/1996 | Troy | 224/549 |
| 5,583,935 | * 12/1996 | Dunchock | 379/454 |
| 5,779,205 | * 7/1998 | Ching | 248/205.8 |
| 5,787,167 | * 7/1998 | Anderson | 379/446 |
| 5,787,168 | * 7/1998 | Lien | 379/455 |
| 5,836,496 | * 11/1998 | Levin et al. | 224/553 |
| 5,836,563 | * 11/1998 | Hsin-Yung | 248/316.4 |
| 5,853,220 | * 12/1998 | Gulich et al. | 297/188.16 |

FOREIGN PATENT DOCUMENTS

| | | |
|---|---|---|
| 237901 | 9/1945 | (DE) . |
| 2670446 | 6/1992 | (FR) . |
| 2047519 | 12/1980 | (GB) . |
| 583355 | 1/1983 | (JP) . |
| 61-122052 | 6/1986 | (JP) . |
| 246569 | 10/1990 | (JP) . |

* cited by examiner

*Primary Examiner*—Anita M. King
(74) *Attorney, Agent, or Firm*—Foley & Lardner

(57) ABSTRACT

A mounting platform includes a slide having a mounting shoe thereon with the slide being mounted to the platform for movement between at least first and second spaced-apart positions. In a preferred embodiment, the platform includes a guide for the slide which is spring-loaded and which slides within the guide and includes interlocking tabs and slots for positively locking the slide in at least two spaced-apart positions, thereby longitudinally moving the mounting shoe between such positions. In a preferred embodiment also, in order to provide a finished appearance to the mounting system, the slide includes a forward section which extends through an aperture formed in the platform and slides along an upper surface thereof with the body of the slide extending through the aperture into the guide such that the aperture remains enclosed by the main body or forward extension for all positions of the slide, thereby enclosing the platform.

34 Claims, 3 Drawing Sheets

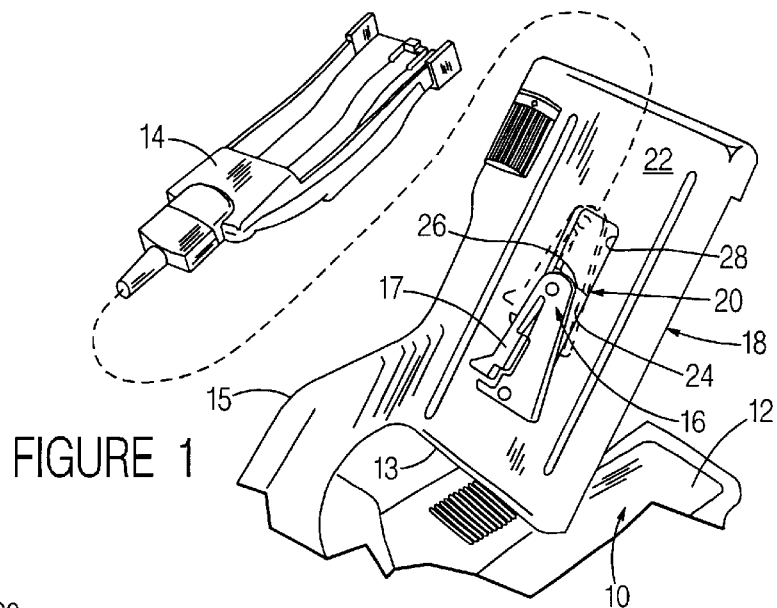
FIGURE 1
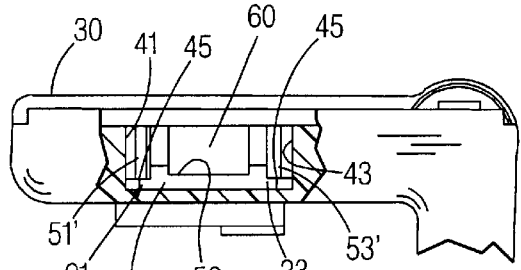
FIGURE 7
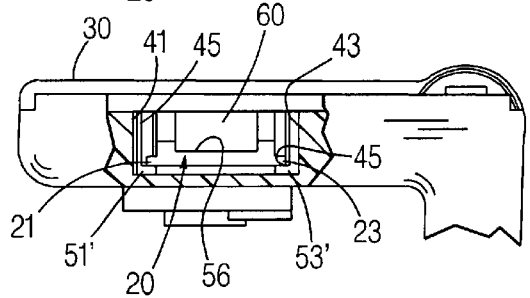
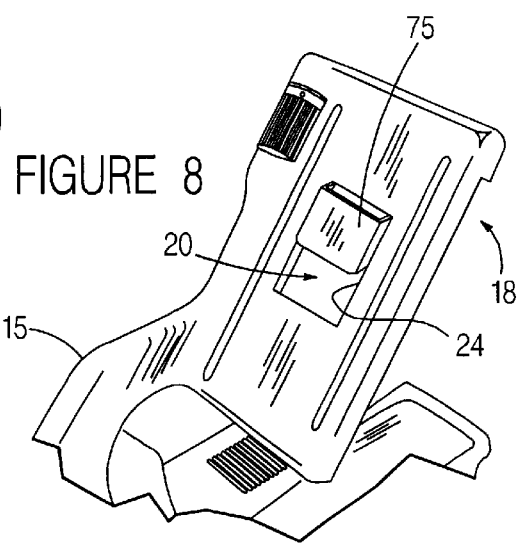
FIGURE 8
FIGURE 9

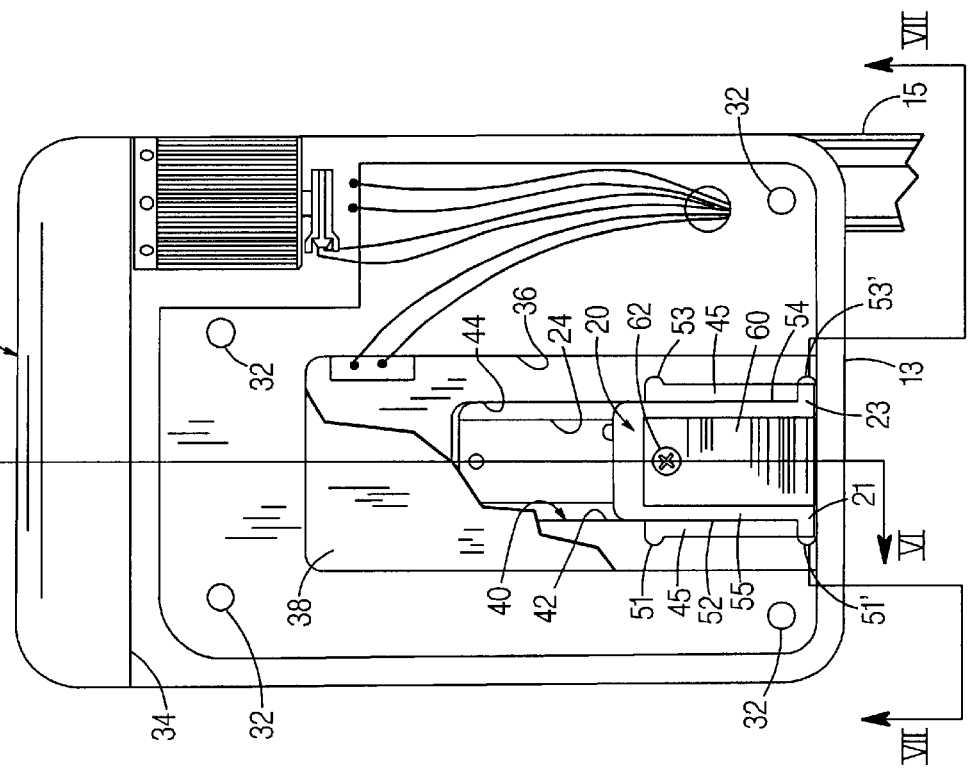

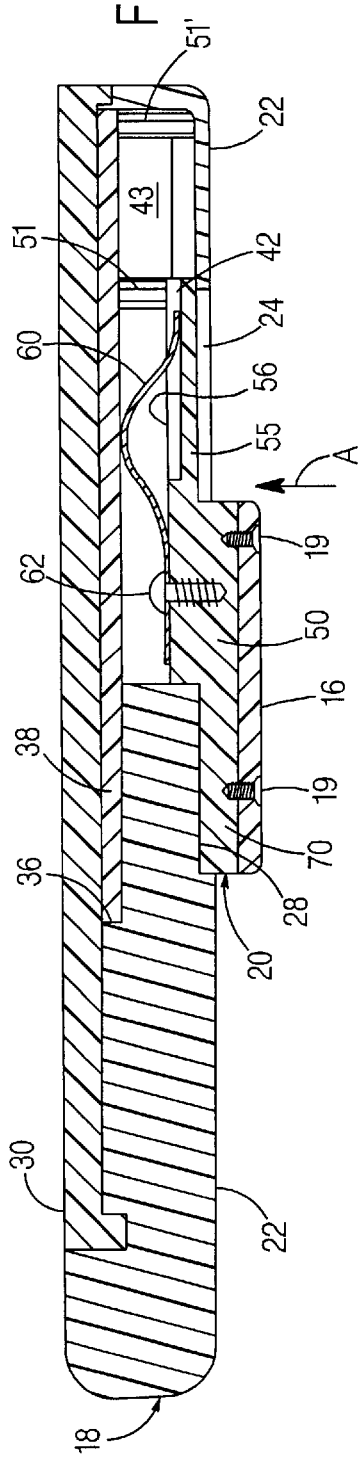

ADJUSTABLE ACCESSORY MOUNT

BACKGROUND OF THE INVENTION

The present invention relates to mounting systems for mounting accessories to a vehicle and particularly to one which is adjustable between multiple fixed positions.

Modern vehicles include a variety of convenience features, many of which are electronic and need to be mounted to a vehicle. Such accessories may include radar detectors, cellular telephones or other communication devices. It is desirable in mounting such accessories to have them conveniently located and, in some instances, easily stored out of the way when not in use. A cellular telephone is a typical example of one such accessory and a variety of different telephone mounting systems for cellular telephones are now available. Typically, a cellular telephone will include a cradle for removably receiving a telephone handset, which cradle can be mounted to a vehicle in a variety of manners. In one system, the telephone cradle is mounted to a platform which, in turn, is pivotally and extendably mounted on an arm system for movement from a stored position within a vehicle armrest storage compartment to an extended, conveniently located use position. U.S. patent application Ser. No. 08/713,140, filed on Sep. 12, 1996, entitled VEHICLE TELEPHONE MOUNTING SYSTEM discloses one such system. The telephone cradle disclosed therein is fixedly mounted to the extendable arm for a particular type of telephone. In order to accommodate a variety of different telephones and to allow their compact storage within the storage compartment of a vehicle armrest when not in use, currently is necessary to provide different cradles or special adapters to allow different phones to be used with the universal telephone storage arm such as disclosed in the above-identified patent application.

Thus, there exists a need for an accessory mount which can accommodate a variety of different devices, such as telephone cradles, to allow their mounting and/or compact storage within a vehicle armrest and subsequent extension for use.

SUMMARY OF THE PRESENT INVENTION

The system of the present invention accommodates this need by providing an accessory mount which includes a platform with a slide having a mounting shoe mounted thereon. The slide is mounted to the platform for movement between at least first and second spaced-apart positions allowing a telephone cradle coupled to said shoe to be moved to different longitudinal positions with respect to the mounting platform, thus, accommodating different mounting systems. The mounting shoe coupled to the slide may take on a variety of forms for receiving different devices including various telephone mounting cradles which are provided with a particular manufacturer's cellular telephone. Although the system is especially adapted for use in connection with cellular telephones, its use can be extended to other accessories which require an adjustable mount.

In a preferred embodiment of the invention, the platform includes a guide for the slide which is spring-loaded and which slides within the guide and includes interlocking tabs and slots for positively locking the slide in at least two spaced-apart positions, thereby longitudinally moving the mounting shoe between such positions. In a preferred embodiment of the invention also, in order to provide a finished appearance to the mounting system, the slide includes a forward section which extends through an aperture formed in the platform and slides along an upper surface thereof with the body of the slide extending through the aperture into the guide such that the aperture remains enclosed by the main body or forward extension for all positions of the slide, thereby enclosing the platform.

These and other features, objects and advantages of the present invention will become apparent upon reading the following description thereof together with reference to the accompanying drawings.

BRIEF DESCRIPTION OF THE DRAWINGS

FIG. 1 is an exploded fragmentary perspective view of an adjustable mount embodying the present invention;

FIG. 2 is an enlarged, partly broken away, bottom plan view of the mounting platform of the mount shown in FIG. 1, shown with the back cover removed and the mount adjusted to a first position;

FIG. 3 is an enlarged, partly broken away, bottom plan view of the mounting platform of the mount shown in FIG. 1, shown with the mount in a second position;

FIG. 4 is a cross-sectional view taken along section line IV—IV of FIG. 2;

FIG. 5 is a cross-sectional view of the structure shown in FIG. 4, shown in an intermediate position, moving the mount from the first to the second position;

FIG. 6 is a cross-sectional view of the structure shown in FIG. 3, taken along section lines VI—VI in FIG. 3;

FIG. 7 is a partial cross-sectional view taken along section line VII—VII of FIG. 3;

FIG. 8 is a cross-sectional view along the same section line as section line VII—VII but with the mount in the intermediate position shown in FIG. 5; and FIG. 9 is a fragmentary perspective view of the adjustable telephone mount of the present invention shown with an alternative mounting shoe.

DETAILED DESCRIPTION OF THE PREFERRED EMBODIMENT

Referring initially to FIG. 1, there is shown in fragmentary perspective form a vehicle armrest 10 typically mounted between the front seats of a vehicle and which includes a storage compartment 12 which includes a cover (not shown) which can be opened to allow a telephone, such as a cellular telephone, to be stored in compartment 12. The telephone mounting system for a telephone handset (not shown) fits into a handset cradle 14 and is coupled to a conventional spring-loaded, generally triangular mounting shoe 16, which has a spring-loaded locking arm 17. Shoe 16 is adjustably mounted to the telephone mounting platform 18 of the present invention. Different mounting cradles 14 for different types of telephones have different lengths and, therefore, make it difficult for one telephone mounting system to accommodate all telephones compactly within the storage area 12 of an armrest 10. Accordingly, the mounting system of the present invention allows different telephone cradles 14 of different sizes to be mounted thereto. For such purpose, the universal mounting shoe 16 is mounted to a slide assembly 20 utilizing suitable threaded fasteners such as screws 19, as seen in FIGS. 1 and 4–6, and can move between a rearward position, as shown in FIGS. 1, 3 and 6, to a forward position, shown in phantom in FIG. 1 and shown in FIGS. 2 and 4.

The slide assembly 20 cooperates with the mounting platform 18 to allow the shoe 16 to be moved between at least two selected fixed positions, the rearward position shown in solid lines in FIG. 1 and the forward adjusted position shown in phantom lines in FIG. 1. Different sized telephone cradles 14 can thus be accommodated by the telephone mounting system. The platform 18 is mounted by an arm 15 to a pivot mechanism which allows the platform 18 to be rotated between stored and use positions. The arm and mounting mechanism for the arm to the console 10 can be of the type described in the above-identified U.S. patent application Ser. No. 08/713,140, the disclosure of which is incorporated herein by reference. Other systems for coupling the mounting platform of the present invention to the armrest for storage can be employed.

Platform 18 includes an upper surface 22 having a generally rectangular aperture 24 formed therein and which communicates at its forward edge 26 with a shallow recess 28 formed partially through the upper surface 22 of the platform 18. Extending through aperture 24 is the slide assembly 20 described in detail below. Platform 18 includes a cover 30 (FIGS. 4–8) on the back side which is attached to the platform by a plurality of threaded fasteners extending into apertures 32. Cover 30 is removed, as seen in FIGS. 2 and 3, to show the construction of the platform which cooperates with the slide assembly 20, allowing the unique controlled movement of the slide between selected adjustable locked positions. Platform 18 includes a recessed area 34 for receiving the cover 30. Additionally, the platform includes a second generally rectangular recessed area 36 which receives a pressure backing plate 38 (shown partly broken away in FIGS. 2 and 3) which is held in place by a cover 30, as seen in FIGS. 4–6, to provide a backing plate for a compression spring 60 associated with slide assembly 20 as described in greater detail below.

Aperture 24 extends through the upper surface 22 of platform 18 and communicates with a guide track 40 (FIGS. 2 and 3) defined by spaced-apart, parallel sidewalls 42, 44 for guidably supporting the sidewalls 52, 54, respectively, of slide assembly 20. The guide track 40 is widened with walls 41, 43 near the rearward facing end 13 of housing 18 by step-cutting areas 41 and 43 into the ABS body of platform 18. A pair of tabs 21 and 23 project outwardly from the sides 52 and 54, respectively, of the slide 20 and the resultant width allows them to slide in the space between guide sides 41 and 43 (as seen in FIG. 5) while the main body 50 of slide 20 extends between sidewalls 42 and 44. Formed downwardly through the ledges 45 (FIGS. 7 and 8) formed by step-cut wall sections 41 and 43 are a pair of opposed, aligned forward slots 51 and 53 and corresponding rearward slots 51' and 53' for receiving tabs 21 and 23, respectively, thereby locking the slide 20 in a forward position, as seen in FIGS. 2 and 4, or a rearward position, as seen in FIGS. 3 and 6.

The slide 20 includes a main body 50 (FIGS. 4–6) with a relatively thin rear rectangular section 55 which includes the outwardly projecting tabs 21 and 23 at its rearward end. Section 55 includes a rectangular recess 56 (FIGS. 7 and 8) for providing a guide for the rectangular compression spring 60 which urges slide section 55 downwardly with tabs 21 and 23 extending into the aligned slots 51, 53 or 51', 53' at the end position of the slide assembly 20. Spring 60 is secured to the main body 50 of slide 20 by suitable fasteners such as a screw 62. Slide 20 further includes a forward extending lip 70 (FIGS. 4–6) offset from rear extension 55 and which nestably fits within the recess 28 of the upper surface 22 of platform 18, as best seen in FIG. 4, when the slide is in the forward most position with tabs 21 and 23 locked in slots 51 and 53.

In operation, with the slide shown in the forward position, as seen in phantom in FIG. 1 and in FIGS. 2 and 4, the operator, before placing the cradle 14 on shoe 16 (assuming that the slide must be in the rearward position for a particular handset cradle), presses downwardly on the shoe in a direction indicated by arrow A in FIG. 4, compressing spring 60 and lifting tabs 21 and 23 out of slots 51 and 53 through the sidewalls 42 and 44, allowing the 15 slide with the tabs 21 and 23 to ride on ledges 45 clearing sides 41 and 43 while pushing the slide rearwardly in a direction indicated by arrow B in FIG. 5 and as illustrated in FIG. 6 until it reaches its rearward most position. In its rearward most position, tabs 21 and 23 align with slots 51' and 53' and spring 60 urges the extension 55 into a generally horizontal position, as seen in FIGS. 3 and 6. By again depressing shoe 16 downwardly, tabs 21 and 23 disengage the slots 51' and 53' and the slide 20 is allowed to be moved forwardly into a position locking within slots 51 and 53. Thus, slide 21 and its attachment shoe 16 provides at least two spaced-apart locking positions for the cradle 14 coupled to the mounting shoe. In some embodiments, it may be desirable to provide additional slots 51 and 53 formed through the ledges 45 in the sidewalls 42, 44 to provide additional adjusted fixed positions. The spacing between sidewalls 41 and 43 allow the clearance of tabs 21 and 23 therebetween so the slide can move easily with the sides of the slide body 50 and forward extension 70 thereof engaging sidewalls 42 and 44.

Thus, there is provided a slide assembly which selectively can be locked in adjusted positions and which includes bias means such as the compression spring 60 for urging locking tabs into locking slots extending laterally along the guide track for such slide and can be easily adjusted to different locked positions by the deflection of the slide assembly to remove the locking tabs from the associated slots. Although in the embodiment shown the slide assembly is used for mounting an accessory such as a telephone mounting cradle to the platform, the mechanism can be likewise used for adjustably mounting other vehicle accessories to a vehicle and allow adjustment to different positions.

In FIG. 9, there is shown a telephone mount mounting shoe 75 which is mounted to the same slide assembly 20 but which includes a generally channel-shaped socket for receiving a different type of cradle mount conventionally used with a variety of cellular telephones. The channel-shaped mount 75 includes an internal locking tab for lockably receiving a cradle therein. Like shoe 16, shoe 75 can be selectively adjusted along the aperture 24 formed in platform 18 by the use of the slide assembly 20 of the present invention.

It will become apparent to those skilled in the art that various modifications to the preferred embodiment of the invention as described herein can be made without departing from the spirit or scope of the invention as defined by the appended claims.

The invention claimed is:

1. An accessory mount for mounting an accessory to a vehicle comprising:

a support body having an aperture therein, said body including a guide track formed therein;

a slide slideably mounted to said body and having a surface extending through said aperture in said body for receiving a vehicle accessory thereon;

means for releasably locking said slide within said guide track; and, a mounting shoe operable to receive the accessory, said mounting shoe attached to said slide.

2. The accessory mount as defined in claim 1 wherein said means for releasably locking said slide to said guide track comprises a ledge formed in said guide track and spaced-apart slots formed therein and wherein said slide includes at least one tab extending therefrom for fitting within said slots.

3. The accessory mount as defined in claim 2 and further including bias means extending between said body and said slide for selectively urging said tab into said slots while allowing movement of said slide in a direction orthogonal to the sliding movement of said slide, such that said tab can be released from said slots to allow said slide to move along said guide track.

4. The accessory mount as defined in claim 3 wherein said slide includes a pair of opposed tabs extending outwardly from opposite sides at one end thereof and the guide track includes pairs of opposed spaced-apart slots.

5. The accessory mount as defined in claim 4 wherein said bias means comprises a leaf spring.

6. The accessory mount as defined in claim 5 wherein said leaf spring is secured to said slide and said body includes a backing plate engaging said spring for urging said slide into said guide track and said tabs into said slots.

7. The accessory mount as defined in claim 6 wherein said slide includes a recess for receiving said leaf spring.

8. The accessory mount as defined in claim 7 wherein said slide includes a forward end extending through said aperture and engaging a surface of said body remote from said backing plate.

9. The accessory mount as defined in claim 8 wherein said surface of said body includes a recess for receiving said forward end of said slide.

10. The accessory mount as defined in claim 9 wherein said slide includes a central section to which said spring is secured and a rearward extending section remote from said forward end and in which said recess for receiving said leaf spring is formed.

11. A telephone mount for mounting a telephone handset receiving cradle to a vehicle comprising: a mounting platform including a guide track formed therein; a slide slideably mounted to said platform; means for releasbly locking said slide within said guide track wherein said means for releasably locking said slide to said guide track comprises a ledge formed in said guide track and spaced-apart slots formed therein; a cradle mounting shoe attached to said slide and wherein said slide includes at least one tab extending therefrom for fitting within said slots.

12. The telephone mount as defined in claim 11 and further including a spring extending between said body and said slide for urging said tab into said slots while allowing movement of said slide in a direction orthogonal to the sliding movement of said slide, such that said tab can release from said slots to allow said slide to move along said guide track.

13. The telephone mount as defined in claim 12 wherein said slide includes a pair of opposed tabs extending outwardly from opposite sides at one end thereof and the guide track includes pairs of opposed spaced-apart slots.

14. The telephone mount as defined in claim 13 wherein said spring comprises a leaf spring.

15. The telephone mount as defined in claim 14 wherein said leaf spring is secured to said slide and said spring engages said platform for urging said tabs of said slide into said slots.

16. The telephone mount as defined in claim 15 wherein said slide includes a recess for receiving said leaf spring.

17. The telephone mount as defined in claim 16 wherein said slide includes a central body extending through an aperture in said platform and said shoe is mounted to said central body.

18. The telephone mount as defined in claim 17 wherein said slide includes an extension and said platform includes a recess for slideably receiving said extension.

19. An accessory mount for mounting an accessory to a vehicle comprising:
    a support body having a guide track formed therein, said guide track having a first pair of spaced-apart walls and a second pair of spaced-apart walls offset from said first pair of walls in a direction orthogonal to the longitudinal axis of said guide track, wherein said second pair of walls are spaced apart a distance greater than said first pair of walls, said first pair of walls including at least one slot formed laterally therein;
    a slide having a body slideably extending between said first pair of walls and a tab extending laterally for extending in said slot for locking said slide in position in said guide track;
    means for mounting said slide within said guide track such that said tab extends between said second pair of walls allowing said slide to move along said guide track; and
    means for mounting a vehicle accessory to said slide.

20. The accessory mount as defined in claim 19 wherein said means for mounting said slide to said guide track includes a spring extending between said body and said slide for urging said tab into said slot but allowing movement of said slide in a direction orthogonal to the sliding movement of said slide, such that said tab can be released from said slot to allow said slide to move along said guide track.

21. The accessory mount as defined in claim 20 wherein said slide includes a pair of opposed tabs extending outwardly from opposite sides at one end thereof and said first pair of walls of said guide track includes pairs of opposed spaced-apart tab-receiving slots.

22. The accessory mount as defined in claim 21 wherein said spring comprises a leaf spring.

23. The accessory mount as defined in claim 22 wherein said leaf spring is secured to said slide and said body engages said spring for urging said tabs of said slide into said slots.

24. The accessory mount as defined in claim 23 wherein said slide includes a recess for receiving said leaf spring.

25. The accessory mount as defined in claim 24 wherein said means for mounting a vehicle accessory to said slide comprises a mounting sleeve.

26. The accessory mount as defined in claim 25 wherein said mounting shoe receives a telephone handset cradle.

27. A armrest for a vehicle comprising:
    a storage compartment disposed within said arm rest;
    a mounting platform wherein, said platform including a guide track formed therein;
    an arm for coupling said mounting platform to said armrest for movement between stored and use positions;
    a slide slideably mounted to said platform;
    means for releasably locking said slide being positioned generally within said guide track; and
    a mounting shoe attached to said slide for receiving a telephone.

28. The armrest as defined in claim 27 wherein said guide track is defined by a first pair of spaced-apart walls and a second pair of spaced-apart walls offset from said first pair of walls in a direction orthogonal to the longitudinal axis of said guide track, wherein said second pair of walls are spaced apart a distance greater than said first pair of walls and wherein said first pair of walls includes at least one slot formed laterally therein.

29. The armrest as defined in claim 28 wherein said slide has a body slideably extending between said first pair of walls and a tab extending laterally for extending in said slot for locking said slide in position in said guide track.

30. The armrest as defined in claim 29 wherein said means for releasably locking said slide to said guide track includes a spring extending between said platform and said slide for urging said tab into said slot but allowing movement of said slide in a direction orthogonal to the sliding movement of said slide, such that said tab can be released from said slot to allow said slide to move along said guide track.

31. The armrest as defined in claim 30 wherein said slide includes a pair of opposed tabs extending outwardly from opposite sides at one end thereof and said first pair of walls of said guide track includes pairs of opposed spaced-apart tab-receiving slots.

32. The armrest as defined in claim 31 wherein said spring comprises a leaf spring.

33. The armrest as defined in claim 32 wherein said leaf spring is secured to said slide and said platform engages said spring for urging said tabs of said slide into said slots.

34. The armrest as defined in claim 33 wherein said slide includes a recess for receiving said leaf spring.

\* \* \* \* \*